(12) United States Patent
Garcia

(10) Patent No.: US 11,558,946 B2
(45) Date of Patent: Jan. 17, 2023

(54) NETWORK BRIDGE TO COMMUNICATION PROTOCOLS FOR LIGHTING SYSTEMS

(71) Applicant: FULHAM COMPANY LIMITED, George Town (KY)

(72) Inventor: Alvaro Garcia, La Habra, CA (US)

(73) Assignee: FULHAM COMPANY LIMITED, George Town (KY)

( * ) Notice: Subject to any disclaimer, the term of this patent is extended or adjusted under 35 U.S.C. 154(b) by 0 days.

(21) Appl. No.: 16/051,861

(22) Filed: Aug. 1, 2018

(65) Prior Publication Data

US 2021/0315086 A1    Oct. 7, 2021

(51) Int. Cl.
*H05B 47/19* (2020.01)
*H05B 47/18* (2020.01)
(Continued)

(52) U.S. Cl.
CPC ............ *H05B 47/19* (2020.01); *H05B 45/10* (2020.01); *H05B 47/11* (2020.01); *H05B 47/165* (2020.01); *H05B 47/18* (2020.01)

(58) Field of Classification Search
CPC .. H05B 45/325; H05B 45/355; H05B 45/375; H05B 45/38; H05B 47/18; G06F 8/654; G06F 9/4411
See application file for complete search history.

(56) References Cited

U.S. PATENT DOCUMENTS 11,477,874 B2    10/2022 Garcia
2014/0265919 A1*  9/2014 Pope ...................... H05B 47/18
                                                   315/294

(Continued)

OTHER PUBLICATIONS

The International Search Report and Written Opinion for counterpart PCT Application No. PCT/US2019/018647 dated Jun. 14, 2019, 10 pages.

(Continued)

*Primary Examiner* — Monica C King
(74) *Attorney, Agent, or Firm* — Womble Bond Dickinson (US) LLP

(57) ABSTRACT

A network bridge for a lighting system is disclosed. For one example, a lighting system includes an inter-integrated circuit ($I^2C$) cable, a light emitting diode (LED) driver, and wireless module coupled to the LED driver by way of the $I^2C$ cable. The LED driver is configured to control one or more LED light sources. The wireless module includes an antenna configured to receive a message according to any number of a plurality of wireless communication protocols. The wireless module is configured to process the message into an $I^2C$ data frame and to deliver the $I^2C$ data frame to the LED driver via the $I^2C$ cable, and the LED driver is configured to control a lighting application or one or more LED light sources based on an $I^2C$ data frame. The message can be a wireless communication protocol message such as a ZigBee message, Bluetooth message or WiFi message. The wireless module includes bridge circuitry configured to process the Zigbee message, Bluetooth message or WiFi message into an $I^2C$ data frame and to deliver the $I^2C$ data frame to the LED driver via the $I^2C$ cable using a serial data communication protocol.

20 Claims, 9 Drawing Sheets

(51) Int. Cl.
  *H05B 45/10*    (2020.01)
  *H05B 47/11*    (2020.01)
  *H05B 47/165*   (2020.01)

(56) References Cited

U.S. PATENT DOCUMENTS

| | | |
|---|---|---|
| 2016/0286616 A1 | 9/2016 | Van De Ven |
| 2018/0042092 A1 | 2/2018 | Bowser et al. |
| 2018/0098403 A1* | 4/2018 | Couch .................... H05B 47/19 |
| 2019/0154439 A1* | 5/2019 | Binder .................... G01S 15/08 |
| 2021/0321505 A1 | 10/2021 | Garcia |

OTHER PUBLICATIONS

The International Preliminary Report on Patentability for counterpart PCT Application No. PCT/US2019/018647 dated Feb. 2, 2021, 8 pages.

Preliminary Amendment filed Jan. 21, 2022 for U.S. Appl. No. 17/265,201, 5 pages.

Non-Final Office Action for U.S. Appl. No. 17/265,201, dated Feb. 17, 2022, 20 pages.

Notice of Allowance dated Jun. 13, 2022 from related U.S. Appl. No. 17/265,201.

* cited by examiner

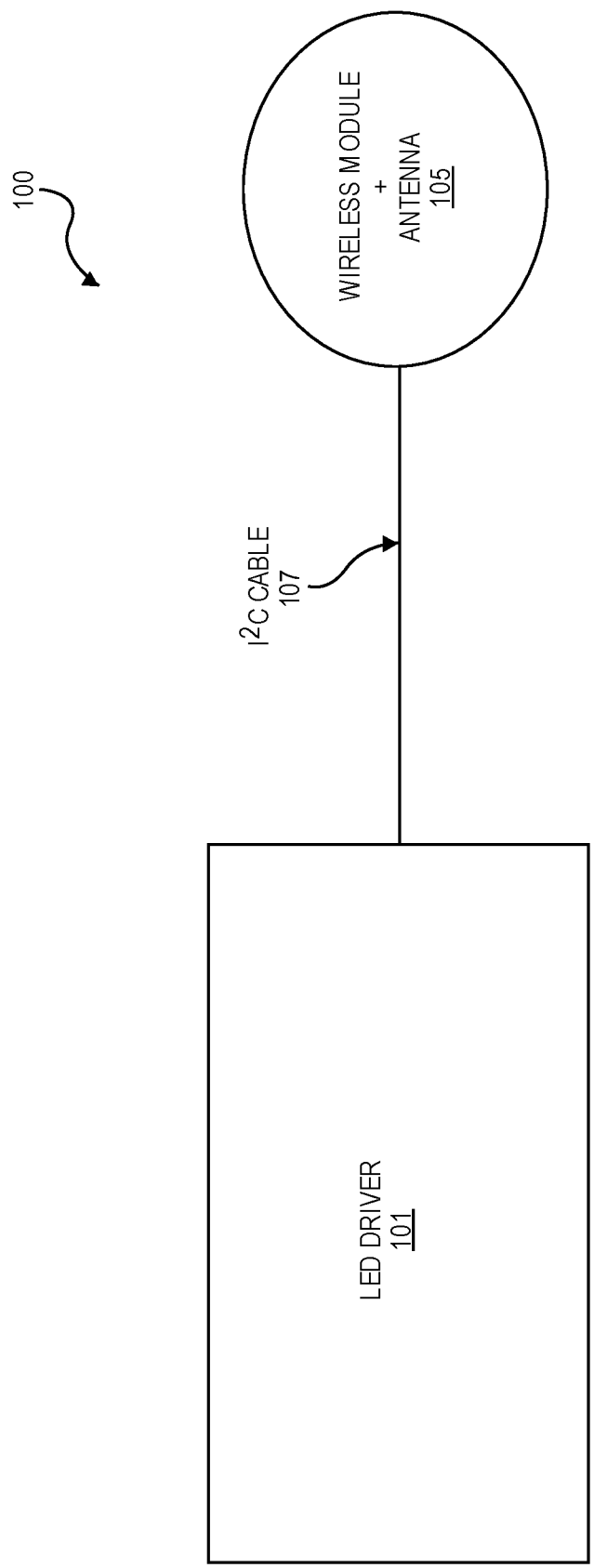

NETWORK BRIDGE TO COMMUNICATION PROTOCOLS FOR LIGHTING SYSTEMS

FIELD

The present invention relates generally to lighting and lighting systems and, more particularly, to a network bridge to communication protocols for lighting systems.

BACKGROUND

A lighting system can include any number of light emitting diode (LED) devices as an illuminating light source. Such lighting systems can include LED drivers to regulate electric power to the LED devices. LED drivers can be coupled to a communication bus to communicate with other circuit components to perform functions for the lighting system. One type of lighting system is an emergency LED lighting system that provides emergency lighting in the event main power is offline or in emergency situations. Lighting systems can be connected to other devices, but existing lighting systems lack network bridges for LED drivers to communicate on a network using different types of communication protocols.

SUMMARY

A network bridge for a lighting system to any number of wireless communication protocols is disclosed. For one example, a lighting system includes an inter-integrated circuit ($I^2C$) cable, a light emitting diode (LED) driver, and a wireless module coupled to the LED driver by way of the $I^2C$ cable. The LED driver is configured to control one or more LED light sources. The wireless module includes an antenna configured to receive a message according to any number of a plurality of wireless communication protocols. The wireless module is configured to act as a network bridge and process the message into an $I^2C$ data frame and to deliver the $I^2C$ data frame to the LED driver via the $I^2C$ cable using a serial data communication protocol. The LED driver can control the one or more LED light sources based on an $I^2C$ data frame. For one example, the LED driver controls LED light sources for an emergency lighting system in case of an emergency or when main power is offline.

For one example, the wireless module can receive the message from a mesh lighting network using a ZigBee, Bluetooth or WiFi wireless communication protocol for a lighting application. The wireless module includes bridge circuitry to process wireless protocol messages, including ZigBee messages, Bluetooth messages or WiFi messages, into a serial data format such as an $I^2C$ data frame and to deliver the $I^2C$ data frame to the LED driver via the $I^2C$ cable using a serial data communication protocol. The wireless module can also include one or more light sensors to measure light surrounding the wireless module. By using bridge circuitry in the wireless module, the lighting system can bridge to different wireless communication protocols to a common serial data protocol such as, e.g., a serial $I^2C$ data communication protocol, which can be used by an LED driver for lighting applications and controlling lighting systems including emergency lighting systems.

Other systems, devices, apparatuses, methods and computer-readable mediums are described.

BRIEF DESCRIPTION OF THE DRAWINGS

The appended drawings illustrate examples and are, therefore, exemplary embodiments and not considered to be limiting in scope.

FIG. 1A illustrates one example of a lighting system having LED driver capable of bridging to varying wireless communication protocols using a wireless module with an antenna.

DETAILED DESCRIPTION

Figure 1B:
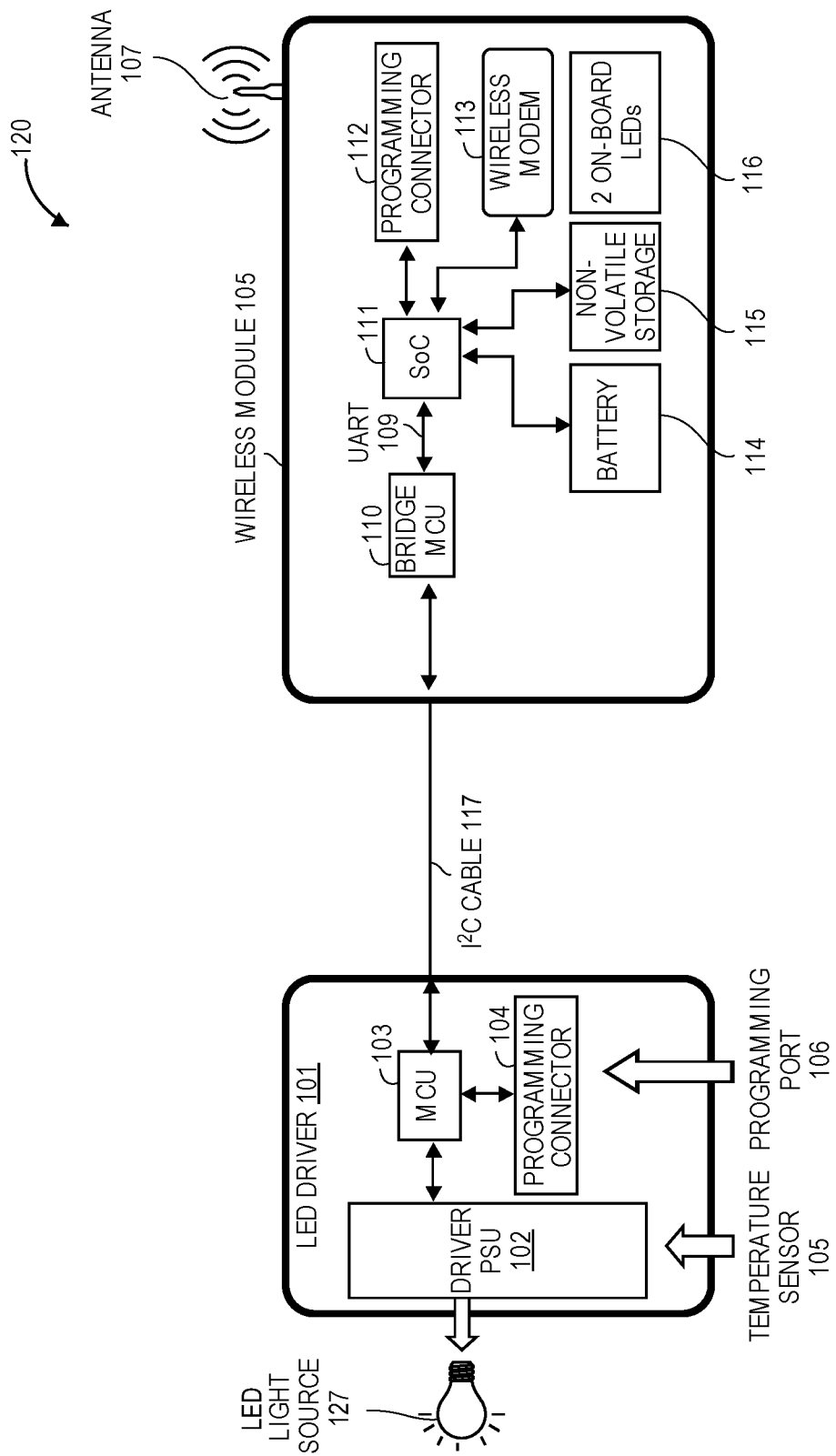
FIG. 1B illustrates one example block diagram of the internal components of the LED driver and wireless module of FIG. 1A.

A network bridge for a lighting system to any number of wireless communication protocols is disclosed. For one example, a lighting system includes a LED driver communicating with a wireless module using a serial data protocol. The wireless module includes a network bridge having an antenna to receive messages according to any number of a plurality of wireless communication protocols, e.g., ZigBee messages, Bluetooth messages or WiFi messages. For one example, the network bridge of the wireless module is coupled to the LED driver using an inter-integrated circuit ($I^2C$) cable providing a serial data communication protocol. The network bridge can process messages according to a wireless protocol into a serial data protocol data frame, e.g., an $I^2C$ data frame, and delivers the serial protocol data frame to the LED driver, e.g., via the $I^2C$ cable using a serial data communication protocol. The LED driver can control a lighting application or one or more LED light sources based on an $I^2C$ data frame. For one example, the LED driver controls LED light sources for an emergency lighting system in case of an emergency or when main power is offline.

As set forth herein, various embodiments, examples and aspects will be described with reference to details discussed below, and the accompanying drawings will illustrate various embodiments and examples. The following description and drawings are illustrative and are not to be construed as limiting. Numerous specific details are described to provide a thorough understanding of various embodiments and examples. However, in certain instances, well-known or conventional details are not described to facilitate a concise discussion of the embodiments and examples. Although the following examples and embodiments are directed to a network bridge for a lighting system, the network bridge can be implemented for any type of system bridging wireless communication protocols with a serial data communication protocol.

Exemplary LED Drivers and Wireless Modules

FIG. 1A illustrates one example of a lighting system 100 having LED driver 101 capable of bridging to varying wireless communication protocols using a wireless module with an antenna 105 (wireless module 105). For the example of FIG. 1A, LED driver 101 is coupled to wireless module 105 by way of an inter-integrated cable (I²C) cable 107. For one example, the I²C cable 103 provides serial protocol communication capabilities on a two-wire interface to couple LED driver 101 with wireless module 105 and allows internal components of LED driver 101 and wireless module 105 to communicate with each other based on the I²C serial protocol.

For one example, LED driver 101 is configured to regulate power to one or more LEDs to provide a light illuminating source. LED driver 101 can receive messages from a network coupled to wireless module 105 which includes an antenna to receive messages according to any number of wireless protocols such as ZigBee, Bluetooth or WiFi. Zigbee is an IEEE 802.15.14 based wireless protocol which can meet low power and bandwidth needs. Bluetooth is a wireless technology standard for exchanging data over short distances from fixed mobile devices and building networks. WiFi is a wireless technology based on IEEE 802.11 for wireless local area networking. For one example, wireless module 105 acts as a network bridge and configured to process the received messages into a serial data protocol data format, such as, e.g., an I²C data frame, and delivers the I²C data frame to LED driver 101 on the I²C cable 107. LED driver 101 can control one or more LEDs based on the received I²C data frame. For one example, lighting system 100 is part of a mesh lighting network and coupled to the mesh lighting network by way of wireless module 105 which can receive messages (e.g., control messages) to control LED driver 101 to change or adjust the lighting of one or more LEDs.

FIG. 1B illustrates one example block diagram 120 of the internal components of the LED driver 101 and wireless module 105 of FIG. 1A. For the example of FIG. 1B, LED driver 101 and wireless module 105 are coupled by way of I²C cable 117. The I²C cable 117 can include a pair of bidirectional communication lines to transmit serial data and can also deliver power between LED driver 101 and wireless module 105. LED driver 101 includes a micro-controller unit (MCU) 103, driver power supply unit (PSU) 102, and a programming connector 104. MCU 103 is connected to I²C cable 117 which is coupled to bridge micro-controller unit (MCU) 110 wireless module 105. MCU 103 of LED driver 101 can communicate with bridge MCU 110 of wireless module 105 according to the I²C serial data communication protocol. For one example, driver PSU 102 can include a micro-controller, system on a chip, processor or other integrated circuits (ICs) to control LED light source 127, e.g., controlling the dimming of LED light source 117. Although one LED light source 127 is shown, driver PSU 102 can control lighting for a plurality of LED light sources. For example, driver PSU 102 can control a constant current or voltage to LED light source 127.

For one example, the lighting control by driver PSU 102 can be programmable. A user input device can communicate with MCU 103 through programming port and connector 104 and 106 and input current or voltage settings to driver PSU 102. Based on these programmable settings, driver PSU 102 can control the output current or voltage to LED light source 127 based on the programmed settings. For one example, LED driver 101 can be programmed to match lighting requirements for LED light source 127, which can also change due to external conditions such as temperature. For one example, driver PSU 102 can receive temperature information from temperature sensor 105 and adjust output current or voltage to LED light source 127 based on changes in temperature accordingly. Driver PSU 102 and MCU 103 can include one or more memory devices (e.g., non-transitory computer-readable media) to store instructions, program code or firmware to be executed by a controller or processor to implement programming of LED driver 101 or control of output current or voltage to LED light source 127.

For one example, wireless module 105 includes an antenna 107, bridge micro-controller (MCU) 110, a system-on-chip (SoC) 111, programming connector 112, wireless modem 113, battery 114, non-volatile storage 115, and on-board LEDs 116. Wireless modem 113 is connected to antenna 107 and provides connectivity to a wireless network for wireless module 105. For another example, wireless modem 113, battery 114 and non-volatile storage 115 can be included in SoC 111. For one example, wireless modem 113 is configured to receive and transmit messages using any number of wireless communication protocols including Zigbee, Bluetooth and WiFi communication protocols. Wireless modem 113 provides connectivity for wireless module 105 to any number of wireless protocols and can modulate and demodulate for wireless communication. Messages received by wireless modem 113 can be processed by SoC 111. The received messages can be Zigbee, Bluetooth and WiFi wireless protocol messages.

For one example, SoC 111 for wireless module 105 can include a micro-controller, system on a chip, processor or other integrated circuits (ICs) and implement or execute instructions, program code or firmware stored, e.g., in non-volatile storage 115, to process received messages from wireless modem 113 and deliver the messages to bridge MCU 110 via universal asynchronous receiver/transmitter (UART) interface 109. UART interface 109 can provide an asynchronous serial communication in which the data format and transmission speeds can be configurable. For one example, SoC 111 delivers received wireless messages to bridge MCU 110 on UART interface 109 as serial data.

For one example, bridge MCU 110 is configured to act as a network bridge between LED driver 101 and wireless communication protocols for wireless module 105. Bridge MCU 110 can include a micro-controller, system on a chip, processor, wireless modem, non-volatile storage devices or other ICs and implement instructions, program code or firmware stored, e.g., in non-volatile storage 115, to process serial data from SoC 111. For example, bridge MCU 110 can process the received serial data from SoC 111 into a serial protocol data format such as an I²C data frame. Bridge MCU 110 can send the I²C data frame to MCU 103 of LED driver 101 on I²C cable 117 using a serial data communication protocol. The I²C data frame can include instructions processed by MCU 103 of LED driver 101 to control a lighting application or one or more LED light sources such as LED light source 127. For one example, I²C data frame can provide light dimming instructions to dim the lighting of LED light source 127.

For one example, battery 114 can provide back-up power or main power for wireless module 105 and, in other examples, battery 114 can provide back-up or main power to LED driver 101. Battery 114 can be any type of rechargeable battery and can provide power to SoC 111 or other components and ICs for wireless module 105. Programming connector 112 can be coupled to a user input device to program wireless module 105 for any type of configuration to wireless module 105 including type of battery or modification to modem and wireless communication protocol configurations. Any number of on-board LEDs 116, e.g., 2 LEDs, can be used to provide lighting for wireless module 105 or provide status information for wireless module 105. Non-volatile storage 115 can be any type of non-volatile storage device or memory such as random-access memory (RAM), read-only memory (ROM), solid state drives, hard disk drives and other types non-volatile storage media.

Figure 2A:
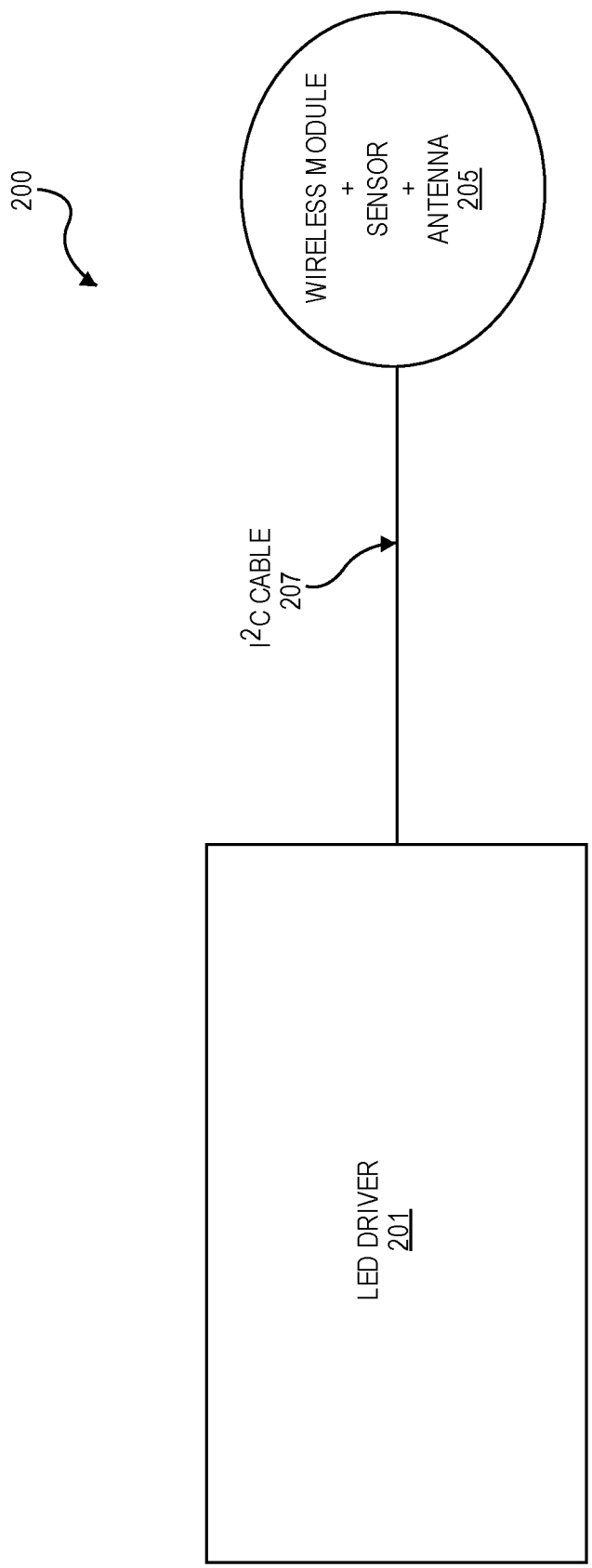
FIG. 2A illustrates one example of a lighting system having LED driver capable of bridging to varying wireless communication protocols using a wireless module with a sensor and an antenna.

FIG. 2A illustrates one example of a lighting system 200 having LED driver 201 capable of bridging to varying wireless communication protocols using a wireless module with a sensor and an antenna 205 (wireless module 205). LED driver 201 can communicate with wireless module 205 using a serial data protocol (e.g., I²C data frames) by way of I²C cable 203. Lighting system 200 operates in the same way as lighting system 100 of FIG. 1A except that wireless module 205 can include a sensor or a plurality of sensors to sense illuminance or infrared lighting. For one example, wireless module 205 can send the sensed lighting information to LED driver 201 that can adjust lighting for LED light source 217 based on the sensed information. For example, the sensed information can be packaged in an I²C data frame and delivered to LED driver 201.

Figure 2B:
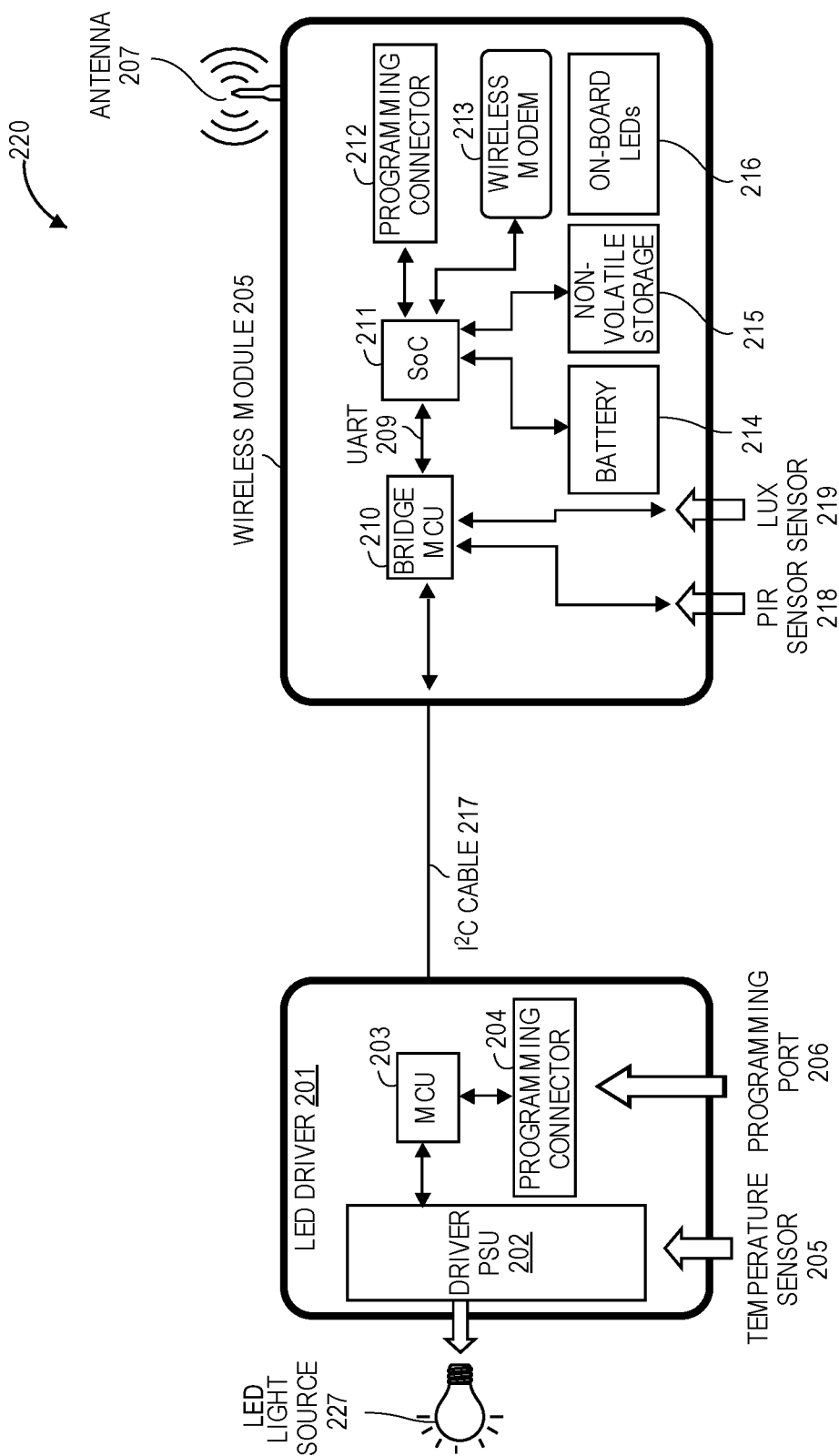
FIG. 2B illustrates one example block diagram of the internal components of the LED driver and wireless module of FIG. 2A.

FIG. 2B illustrates one example block diagram of the internal components of the LED driver 201 and wireless module 205 of FIG. 2A. Referring to FIG. 2B, the internal components of LED driver 201 such as driver PSU 202, MCU 203, programming connector 204, programming port 206 and temperature sensor 205 operate in the same way as the same components of LED driver 101 of FIG. 1B. Similarly, the internal components of wireless module 205 such as bridge MCU 210, SoC 211, UART interface 209, programming connector 212, wireless modem 213, battery 214, non-volatile storage 215 and on-board LEDs 216 operate in the same way as the same components of wireless module 105 of FIG. 1B. Wireless modem 213, battery 214 and non-volatile storage 215 can also be internal components of SoC 211. The wireless module 205, however, includes passive infrared sensor 218 (PIR sensor 218) and illuminance and luminous emittance sensor 219 (LUX sensor 219) that can sense infrared light and luminous flux per unit area (e.g., light intensity), respectively. Sensed light information from PIR sensor 218 and LUX sensor 219 can be passed or sent to bridge MCU 210, which can include that information in an I²C data frame to MCU 201 of LED driver 201. MCU 201 of LED driver 210 can use the sensed light information to control a lighting application or one or more LED light sources 227. For another example, the sensed light information can be delivered to SoC 211 by way of UART 209.

Exemplary Wireless Modules

Figure 3B:
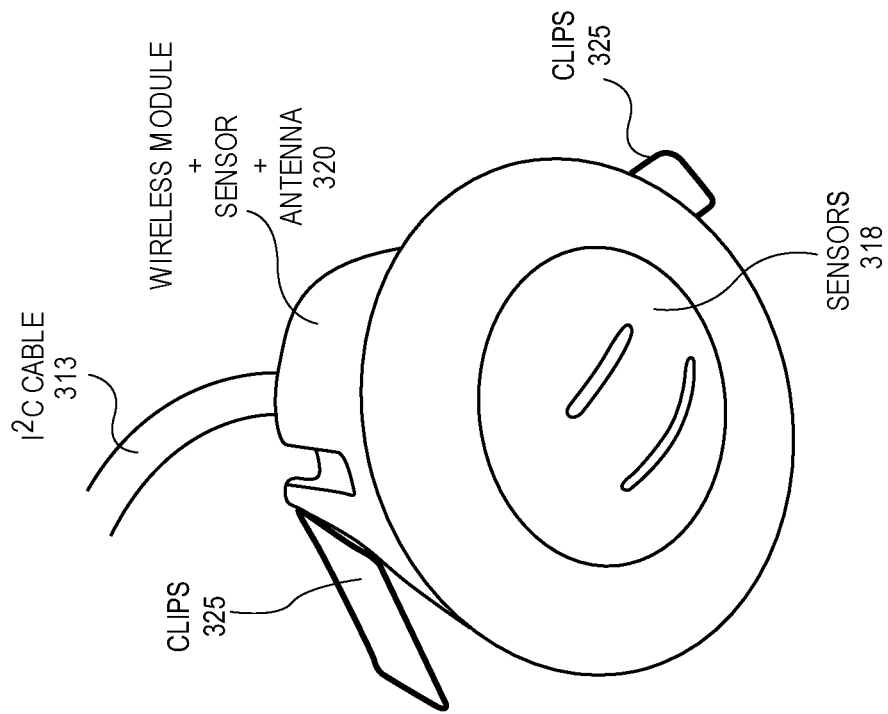
FIG. 3B illustrates one example view of a wireless module having an antenna and a sensor.
Figure 3A:
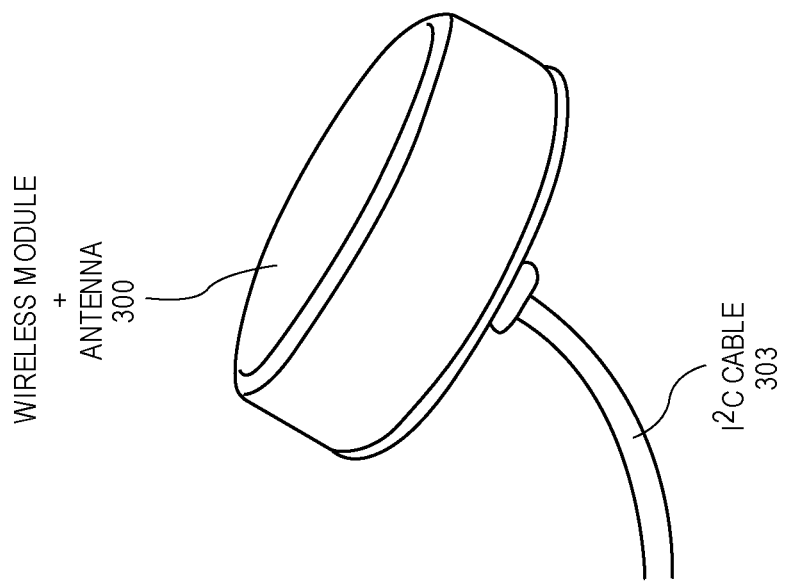
FIG. 3A illustrates one example view of a wireless module having an antenna.

FIGS. 3A-3B illustrates example view of a wireless module having an antenna 300 (wireless module 300) and a wireless module having an antenna and a sensor 320 (wireless module 320). Referring to FIG. 3A, wireless module 300 can have an embedded wireless antenna and have a circular disk shape to house internal components such as those shown for wireless module 105 of FIG. 1B including bridge circuitry (e.g., bridge MCU 110) to bridge lighting applications to wireless communication protocols. Coupled to wireless module 300 is an I²C cable 303 that can connect wireless module 300 with an LED driver, e.g., LED driver 101, to control a lighting application or one or more LED light sources such as light source 127. Wireless module 300 can communicate serial protocol data frames with an LED driver using I²C as described in FIG. 5. For one example, wireless module 305 can be configured to support different combinations of Zigbee, Bluetooth or WiFi wireless communication protocols.

Referring to FIG. 3B, wireless module 320 can have a different shape and configuration than wireless module 300 of FIG. 3A. Wireless module 320 can have a circular top shape with embedded sensor 318 with a column shaped base. Embedded sensors 318 can include, e.g., PIR sensor 218 and LUX sensor 219 as shown in FIG. 2B, to detect light luminance or other light information surrounding wireless module 320. Wireless module 320 also includes an embedded wireless antenna and can house internal components such as those shown for wireless module 205 of FIG. 2B including bridge circuitry (e.g., bridge MCU 210) to bridge lighting applications to wireless communication protocols. Wireless module 320 can be coupled to an LED driver by way of I²C cable 313 and can send I²C data frames (as described in FIG. 5) to an LED driver, e.g., LED driver 201, to control a lighting application or one or more LED light sources such as light source 227 in FIG. 2B. Clips 235 can be used to securely lock in place or attach wireless module 320 in various locations within a room, building or other objects. For one example, wireless module 320 can be configured to support different combinations of Zigbee, Bluetooth or WiFi wireless communication protocols.

Exemplary Lighting System Network with Network Bridges

Figure 4:
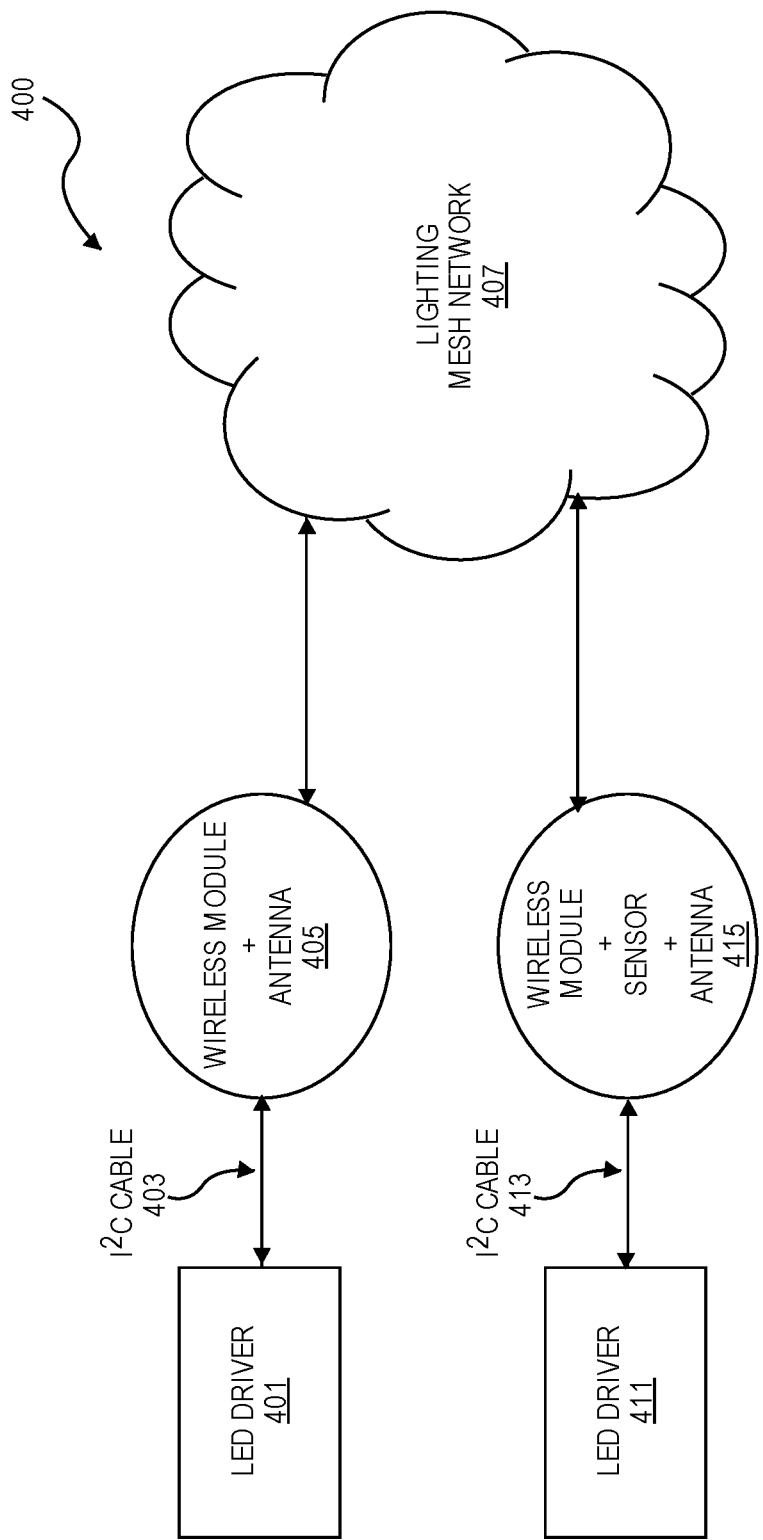
FIG. 4 illustrates one example of a system having a plurality of lighting systems connected to lighting mesh network.

FIG. 4 illustrates one example of a system 400 having a plurality of lighting systems connected to lighting mesh network 407. For one example, lighting mesh network 407 allows lighting applications to be networked with a number of lighting systems supporting any number of wireless communication protocols (e.g., Zigbee, Bluetooth or WiFi). Referring to FIG. 4, as an example, one lighting system includes LED driver 401 coupled to wireless module and antenna 405 (wireless module 405) by way of I²C cable 403. Another lighting system includes LED driver 411 coupled with wireless module with a sensor and antenna 415 (wireless module 415) by way of I²C cable 415. Although two lighting systems are shown in FIG. 4, any number of lighting systems can be coupled to lighting mesh network 407.

For one example, lighting mesh network 407 is configured for a Bluetooth wireless communication protocol and messages which can be received by wireless modules 405 and 415. Wireless modules 405 and 415 include network bridges, e.g., bridge MCUs 110 and 210 as described above in FIGS. 1B and 2B, that processes wireless messages which can contain lighting application instructions or control instructions for one or more LED light sources into a serial protocol data frame such as an I²C data frame. Wireless modules 405 and 415 sends the I²C data frame by way of I²C cables 403 and 413 to respective LED drivers 401 and 411 to control a lighting application or LED light sources.

Exemplary Network Bridge Messaging and Operations

Figure 5:
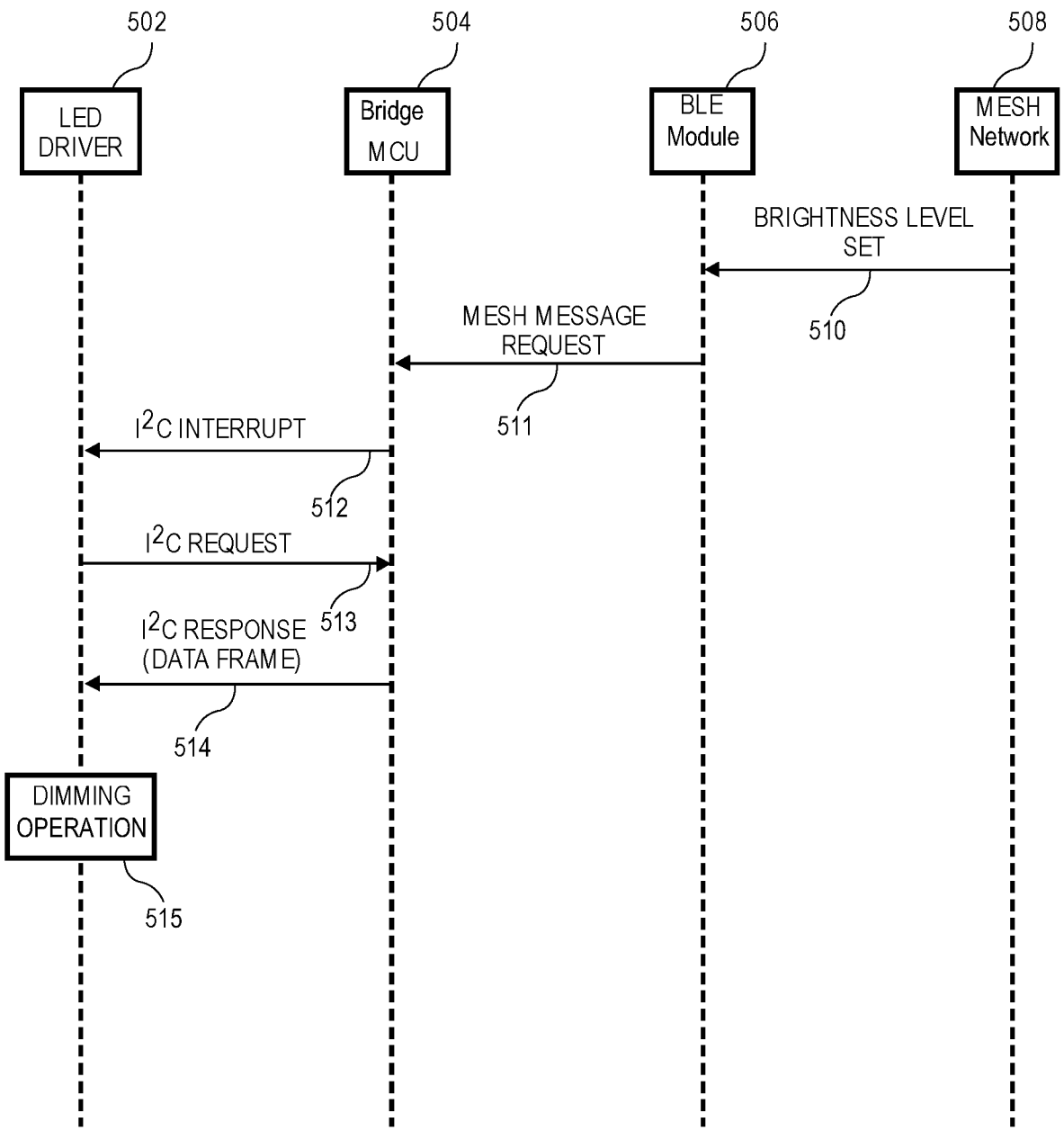
FIG. 5 illustrates one example of communication messaging from a lighting mesh network to a LED driver using $I^2C$ serial communication protocol.

FIG. 5 illustrates one example of communication messaging from a lighting mesh network 508 to a LED driver 502 using the I²C serial communication protocol. This exemplary messaging can be implemented by the lighting systems 110, 120, 200 and 220 of FIGS. 1A-2B and lighting network 400 of FIG. 4. Referring to FIG. 5, mesh network 508 can send an instruction message to LED driver 502. For example, mesh network 508 can send a brightness level set message 510 to Bluetooth low energy module 506 (BLE module 506) according to the BLE wireless communication protocol. In other examples, module 507 and mesh network 508 can be configured to communicate other types of wireless communication protocol messages such as Zigbee or WiFi messages. For one example, a wireless modem and antenna for BLE module 506 can receive the brightness level set message 510 from mesh network 508 according to the BLE protocol. Within BLE module 506, the brightness level set message 510 is processed into serial data as a mesh message request 511 and delivered to bridge MCU 504.

For one example, after receiving mesh message 511, bridge MCU 504 sends an interrupt, e.g., I²C interrupt 512, to LED driver 502 that it has a mesh message request which contains a brightness level set instruction message 510 from mesh network 508. Bridge MCU 504 can send the I²C interrupt using I²C cable. After receiving the I²C interrupt 512, LED driver sends an I²C request 513 to bridge MCU 504 that it is ready to receive the mesh message request 511. For one example, bridge MCU packages the mesh message request 511 into an I²C data frame and sends a I²C response data frame 514 to LED driver 502 on a I²C cable. The I²C data frame 514 contain a dimming operation instruction 515. LED driver 502 can process the dimming operation 515 to dim lighting for one or more LED light sources.

Figure 6:
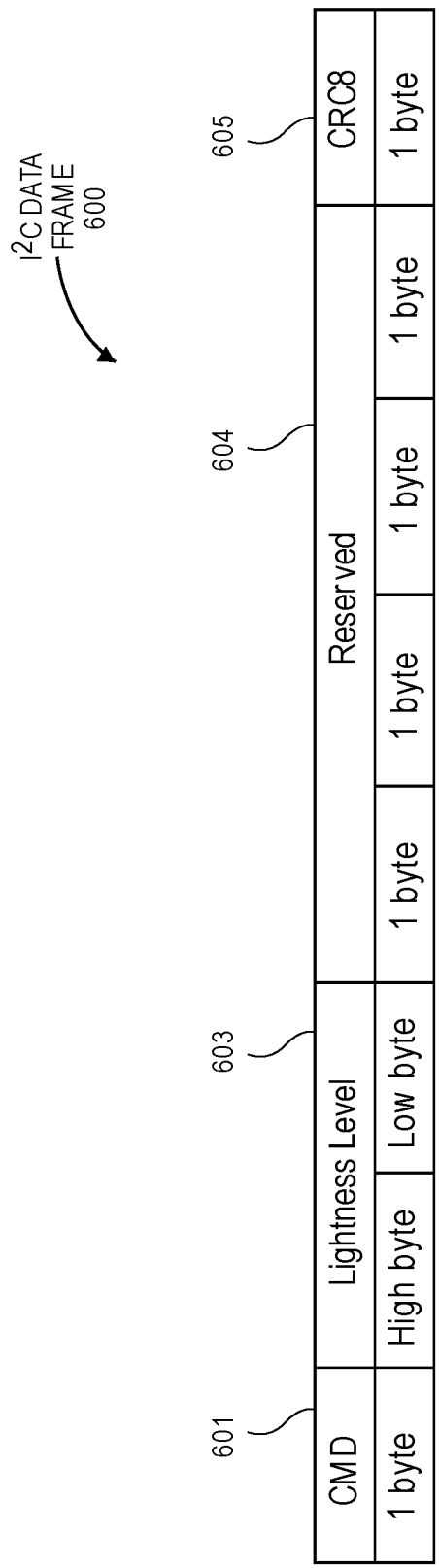
FIG. 6 illustrates one example of an $I^2C$ data frame.

FIG. 6 illustrates one example of an I²C data frame 600. I²C data frame 600 includes a CMD section 610, lightness level section 603, reserved section 604, and CRC8 section 605. CMD section 601 includes 1 byte that can contain a type of command for I²C data frame 600, e.g., dimming command. The lightness level 603 can include a high byte and low byte to provide the lightness level to be used for a lighting command such as a dimming command. The reserved section 604 can include 4 bytes and can contain any type of information or data such as address information of device information or other device and networking data. The CRC8 section 605 contain at type of cyclic redundancy check (CRC) error detection code which can be used if the data frame has been correcting transmitted.

Figure 7:
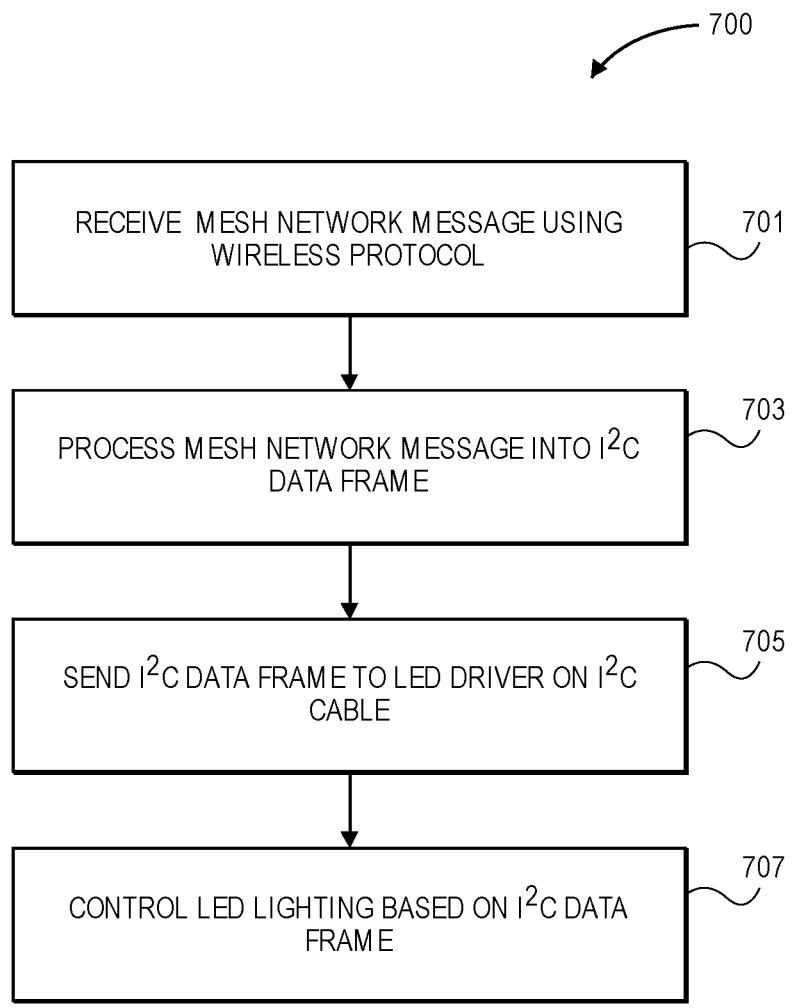
FIG. 7 illustrates one example flow diagram of an operation to control a lighting system using an $I^2C$ data frame.

FIG. 7 illustrates one example flow diagram of an operation 700 to control a lighting system using an I²C data frame. Operation 700 includes operations 701 through 707. At operation 701, a mesh network message is received using a wireless protocol by a wireless module of a lighting system. Examples of wireless protocols include Zigbee, Bluetooth and WiFi types of wireless protocols. At operation 703, the wireless module processes the mesh network message into a serial protocol data frame, e.g., an I²C data frame. At operation 705, the wireless module sends the I²C data frame to a LED driver on an I²C cable. At operation 707, the LED driver can control LED lighting, e.g., a lighting application or one or more LED light sources based on the I²C data frame. For one example, the I²C data frame includes a dimming operation and, after receiving the I²C data frame, the LED driver can dim one or more LED light sources based on the instruction in the I²C data frame. Operation 700 can be implemented by any of the lighting systems as described in FIGS. 1A-S.

In the foregoing specification, the invention has been described with reference to specific exemplary embodiments and examples thereof. It will, however, be evident that various modifications and changes may be made thereto without departing from the broader spirit and scope of disclosed examples and embodiments. The specification and drawings are, accordingly, to be regarded in an illustrative rather than a restrictive sense.

What is claimed is:

1. A lighting system comprising:
   an inter-integrated circuit (I²C) cable;
   a light emitting diode (LED) driver configured to control one or more LED light sources; and
   a wireless module coupled to the LED driver by way of the I²C cable, the wireless module having an antenna and a processor coupled to the antenna that is configured to receive a brightness level set message according to any of a plurality of wireless communication protocols, wherein the processor is configured to process the brightness level set message that is in a wireless communication protocol message into a dimming instruction in an I²C data frame and to deliver the dimming instruction in the I²C data frame to the LED driver via the I²C cable, and wherein the LED driver is configured to control a lighting application or one or more LED light sources based on the dimming instruction in the I²C data frame.

2. The lighting system of claim 1, wherein the processor is to receive the brightness level set message from a mesh lighting network.

3. The lighting system of claim 1, wherein the plurality of wireless communication protocols include ZigBee, Bluetooth or WiFi wireless communication protocols.

4. The lighting system of claim 3, wherein the processor is configured to process brightness level set message that is in a ZigBee message, Bluetooth message or WiFi message into an I²C data frame.

5. The lighting system of claim 4, wherein the wireless module includes a bridge circuitry coupled to the processor that is configured to process the Zigbee message, Bluetooth message or WiFi message into the I²C data frame and to deliver the I²C data frame to the LED driver via the I²C cable using a serial data communication protocol.

6. The lighting system of claim 1, wherein the wireless module further includes one or more light sensors to measure light.

7. A method for a lighting system comprising:
   receiving, at a wireless module, a brightness level set message according to one of a plurality of wireless protocols;
   processing the brightness level set message that is in a wireless protocol message, at the wireless module, into a dimming instruction in a serial data protocol data frame;
   delivering the dimming instruction in the serial data protocol data frame to a light emitting diode (LED) driver; and controlling a lighting application or one or more light emitting diodes (LEDs) based on the dimming instruction in the serial data protocol data frame.

8. The method of claim 7, wherein receiving the brightness level set message includes receiving the brightness level set message according to a Zigbee, Bluetooth or WiFi wireless protocol.

9. The method of claim 7, wherein the serial data protocol data frame is an inter-integrated circuit (I²C) serial protocol data frame.

10. The method of claim 9, wherein controlling the lighting application includes dimming the one or more LEDs based on the dimming instruction in the I²C serial protocol data frame.

11. The method of claim 9, wherein the dimming instruction in the I²C serial protocol data frame is delivered to the LED driver on a I²C cable.

12. One or more non-transitory computer-readable media including instructions, which if executed by one or more processors, causes the one or more processors to implement an operation comprising:

receiving, at a wireless module, a brightness level set message according to one of a plurality of wireless protocols;

processing the brightness level set message that is in a wireless protocol message, at the wireless module, into a dimming instruction in a serial data protocol data frame;

delivering the dimming instruction in the serial data protocol data frame to a light emitting diode (LED) driver; and controlling a lighting application or one or more light emitting diodes (LEDs) based on the dimming instruction in the serial data protocol data frame.

13. The one or more non-transitory computer-readable media of claim 12, wherein the operation further includes receiving the brightness level set message according to a Zigbee, Bluetooth or WiFi wireless protocol.

14. The one or more non-transitory computer-readable media of claim 12, wherein the serial data protocol data frame is an inter-integrated circuit ($I^2C$) serial protocol data frame.

15. The one or more non-transitory computer-readable media of claim 14, wherein the operation further includes dimming the one or more LEDs based on the dimming instruction in the $I^2C$ serial protocol data frame.

16. The one or more non-transitory computer-readable media of claim 14, wherein operation further includes transmitting the dimming instruction in the $I^2C$ serial protocol data frame to the LED driver on a $I^2C$ cable.

17. A wireless module for a lighting system comprising:
a wireless modem and antenna to receive a brightness level set message according to one of a plurality of wireless protocols; and
a micro-controller to process the brightness level set message that is in a wireless protocol message into a dimming instruction in an inter-integrated circuit ($I^2C$) data frame and to deliver the dimming instruction in the $I^2C$ data frame to a (LED) driver, wherein the LED driver controls a lighting application or one or more light emitting diodes (LEDs) based on the dimming instruction in the ($I^2C$) data frame.

18. The wireless module of claim 17, further comprising one more light sensors to sense light.

19. The wireless module of claim 17, wherein the wireless modem and antenna configured to receive the message from a mesh lighting network.

20. The wireless module of claim 17, further comprising a programming connector to receive user input to program a configuration of the wireless module.

* * * * *